Patented July 14, 1953

2,645,642

UNITED STATES PATENT OFFICE 2,645,642

PROCESS FOR THE MANUFACTURE OF HYDROXY-INDAZOLES

Dennis Arthur William Adams, Headingley, Leeds, and Robert Ronald Davies and Robert Hugh Wilson, Blackley, Manchester, England, assignors to Imperial Chemical Industries Limited, a corporation of Great Britain No Drawing. Application October 11, 1951, Serial No. 250,948. In Great Britain October 19, 1950

3 Claims. (Cl. 260—310)

This invention relates to a process for the manufacture of dyestuff intermediates.

Although 6-hydroxyindazole has been known for some years, it has not hitherto attracted much attention as a commercial dyestuff intermediate because the only known method for the manufacture of the compound is by the decomposition of the diazonium derivative of 6-aminoindazole, which method gives only low yields (55%) of the compound in a very impure form.

We have found that by heating 6-aminoindazole with dilute sulphuric acid under pressure, a high yield of good quality 6-hydroxyindazole can be obtained. We have also found that the other hydroxyindazoles, which have not hitherto been known, can be obtained by heating the corresponding amino compound with dilute sulphuric acid under pressure.

According to our invention we provide a process for the manufacture of hydroxyindazoles which comprises heating the corresponding aminoindazole with dilute sulphuric acid under pressure at a temperature between about 150° C. and about 210° C. and preferably between 170° C. and 180° C.

In carrying out the process of the invention, the aminoindazole and dilute sulphuric acid, or if desired the aminoindazole sulphate and water, may be introduced into an autoclave and heated under pressure until the reaction is substantially completed and the solution thus obtained may be filtered to remove any small traces of insoluble matter, treated with caustic soda to neutralise the mineral acidity, cooled and, if necessary, treated with salt to precipitate the hydroxyindazole.

In addition to 6-hydroxyindazole already mentioned, the following hydroxyindazoles, all of which are new compounds, are examples of the compounds which can be made by the process of the present invention: 4-, 5- and 7-hydroxyindazoles, 6-hydroxy-3-methylindazole, 6-hydroxy-7-methylindazole, 4-hydroxy-7-methylindazole and 4-hydroxy-6-methylindazole.

The products obtained by the process of our invention are valuable intermediates which are especially useful as coupling components in the manufacture of azo dyestuffs.

The invention is illustrated but not limited by the following examples in which the parts are by weight.

Example 1

66.5 parts of 6-aminoindazole and 500 parts of 10% sulphuric acid are introduced into an autoclave and heated to 175° C. The mixture is maintained at a temperature between 175° C. and 180° C. for 10–12 hours, the pressure in the autoclave being about 200 lbs. per square inch. The solution so obtained is cooled and filtered to remove any insoluble material. Caustic soda solution is then added to neutralise the mineral acidity, and the suspension so obtained is cooled to 20° C. and filtered. An 88% yield of 6-hydroxyindazole is obtained in the form of pale fawn plate crystals melting at 215° C. The product can be purified by recrystallization from water, when the melting point is raised to 217° C.

In place of the 66.5 parts of 6-aminoindazole and 500 parts of 10% sulphuric acid, 115.5 parts of 6-aminoindazole sulphate and 500 parts of water may be used.

Example 2

66.5 parts of 5-aminoindazole and 500 parts of 10% sulphuric acid are heated together in an autoclave at 175–180° C. as described in Example 1. The solution from the autoclave is filtered and neutralised with caustic soda and salt is then added until a concentration of 10% salt is obtained. The 5-hydroxyindazole which is precipitated is filtered off. A 93% yield of a product melting at 183° C. is obtained.

What we claim is:

1. A process for the manufacture of hydroxyindazoles which comprises heating the corresponding aminoindazole with dilute sulphuric acid under super-atmospheric pressure at a temperature between about 150° C. and about 210 C. until the reaction is substantially completed.

2. Process as claimed in claim 1 wherein the hydroxyindazoles are selected from the group consisting of the 4, 5, 6 and 7 hydroxyindazoles and the methyl derivatives of such hydroxyindazoles wherein the methyl substituent is attached to a carbon atom of the indazole nucleus.

3. Process as claimed in claim 1 wherein the temperature is kept between 170°–180° C.

DENNIS ARTHUR WILLIAM ADAMS.
ROBERT RONALD DAVIES.
ROBERT HUGH WILSON.

References Cited in the file of this patent

Witt et al., Deut. Chem. Berichte 23, pages 3635–44.

Fries et al., Annalen der. Chemie 404, pages 81–92.